US011005966B2

(12) United States Patent
Ford et al.

(10) Patent No.: US 11,005,966 B2
(45) Date of Patent: *May 11, 2021

(54) WEB COMMUNICATION BASED CONTENT SERVICING AND DELIVERY SYSTEM, METHOD, AND COMPUTER PROGRAM

(71) Applicants: Carl Ford, Boca Raton, FL (US); Claude Hayn, Frederick, MD (US); Alan B Johnston, Haddon Township, NJ (US)

(72) Inventors: Carl Ford, Boca Raton, FL (US); Claude Hayn, Frederick, MD (US); Alan B Johnston, Haddon Township, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/679,187

(22) Filed: Nov. 9, 2019

(65) Prior Publication Data
US 2020/0128099 A1 Apr. 23, 2020

Related U.S. Application Data

(63) Continuation of application No. 15/894,865, filed on Feb. 12, 2018, now Pat. No. 10,506,070.
(Continued)

(51) Int. Cl.
*H04L 29/08* (2006.01)
*H04L 29/06* (2006.01)
*G06Q 30/02* (2012.01)

(52) U.S. Cl.
CPC ........ *H04L 67/306* (2013.01); *H04L 65/1069* (2013.01); *H04L 67/141* (2013.01);
(Continued)

(58) Field of Classification Search
CPC .............. H04L 67/306; G06Q 30/0269; G06Q 30/0255
See application file for complete search history.

(56) References Cited

U.S. PATENT DOCUMENTS

| 8,521,778 B2 * | 8/2013 | James | H04L 67/306 707/784 |
| 8,645,992 B2 * | 2/2014 | Russell | H04N 21/4331 725/34 |

(Continued)

FOREIGN PATENT DOCUMENTS

| CA | 2358328 a1 | 6/2002 |
| WO | 2014000243 A1 | 1/2014 |

(Continued)

OTHER PUBLICATIONS

WebRTC Tutorial at https://www.tutorialspoint.com/webrtc/ (c) 2015.

*Primary Examiner* — Lashonda T Jacobs

(57) ABSTRACT

A system, method, and computer program product for web communication based content servicing and delivery. In use, a first communication session is established with a user using a first embedded communication data channel. Next, during the first communication session, a second communication session is established using a second embedded communication data channel. Further, a plurality of profiles is exchanged using the second embedded communication data channel, wherein the plurality of profiles is associated with the user and with a content provider. Additionally, while simultaneously maintaining the first communication session and the second communication session, content is exchanged based on the plurality of profiles using the second embedded communication data channel.

20 Claims, 9 Drawing Sheets

Related U.S. Application Data

(60) Provisional application No. 62/458,480, filed on Feb. 13, 2017.

(52) U.S. Cl.
CPC ..... *G06Q 30/0255* (2013.01); *G06Q 30/0269* (2013.01); *G06Q 30/0277* (2013.01); *H04L 67/02* (2013.01); *H04L 67/1065* (2013.01); *H04L 69/18* (2013.01)

(56) References Cited

U.S. PATENT DOCUMENTS

| | | | |
|---|---|---|---|
| 9,356,918 B2* | 5/2016 | Tsui | G06F 21/10 |
| 9,363,365 B1* | 6/2016 | Nekorystnov | H04M 3/2227 |
| 9,560,023 B2 | 1/2017 | Wilson | |
| 2003/0059053 A1 | 3/2003 | Medvinsky et al. | |
| 2008/0262928 A1 | 10/2008 | Michaelis | |
| 2008/0276000 A1* | 11/2008 | Motte | H04L 12/14 709/233 |
| 2009/0190505 A1 | 7/2009 | Gassewitz et al. | |
| 2013/0073366 A1 | 3/2013 | Heath | |
| 2014/0137188 A1 | 5/2014 | Bartholomay et al. | |
| 2014/0181212 A1* | 6/2014 | Cong | G06F 16/9537 709/204 |
| 2014/0316899 A1 | 10/2014 | McGowan et al. | |
| 2014/0316902 A1 | 10/2014 | Jouan | |
| 2014/0344169 A1* | 11/2014 | Phelps | G06Q 30/016 705/304 |
| 2014/0379931 A1* | 12/2014 | Gaviria | H04L 67/02 709/227 |
| 2015/0039760 A1* | 2/2015 | Yoakum | H04L 65/608 709/225 |
| 2015/0264626 A1* | 9/2015 | Perdomo | H04L 5/00 370/216 |
| 2017/0272824 A1* | 9/2017 | Bunner | H04W 8/005 |

FOREIGN PATENT DOCUMENTS

| | | |
|---|---|---|
| WO | 2013039573 A3 | 5/2014 |
| WO | 2015150749 a1 | 10/2015 |

\* cited by examiner

WEB COMMUNICATION BASED CONTENT SERVICING AND DELIVERY SYSTEM, METHOD, AND COMPUTER PROGRAM

CROSS-REFERENCE TO RELATED APPLICATIONS

This application is a continuation of and claims priority to U.S. patent application Ser. No. 15/894,865, filed Feb. 12, 2018, titled "WEB COMMUNICATION BASED CONTENT SERVICING AND DELIVERY SYSTEM, METHOD, AND COMPUTER PROGRAM," which is herein incorporated in its entirety by reference for all purposes.

FIELD OF THE INVENTION

The present invention generally relates to Internet communication establishment and more particularly to content delivery managed by a data channel incorporating user profile and advertisement and content profile with analytics.

BACKGROUND

Traditional methods of content delivery over internet use hyperlinks and analytics to target, identify and connect with individuals. However, such methods often occur without direct communication between a content provider and end user. As such, the accuracy and quality of the content delivery may be directly reduced.

There is thus a need for overcoming these and other issues associated with the prior art.

SUMMARY

A system, method, and computer program product for web communication based content servicing and delivery. In use, a first communication session is established with a user using a first embedded communication data channel. Next, during the first communication session, a second communication session is established using a second embedded communication data channel. Further, a plurality of profiles is exchanged using the second communication data channel, wherein the plurality of profiles is associated with the user and with a content provider. Additionally, while simultaneously maintaining the first communication session and the second communication session, content is exchanged based on the plurality of profiles using the second embedded communication data channel.

DETAILED DESCRIPTION

Figure 1:
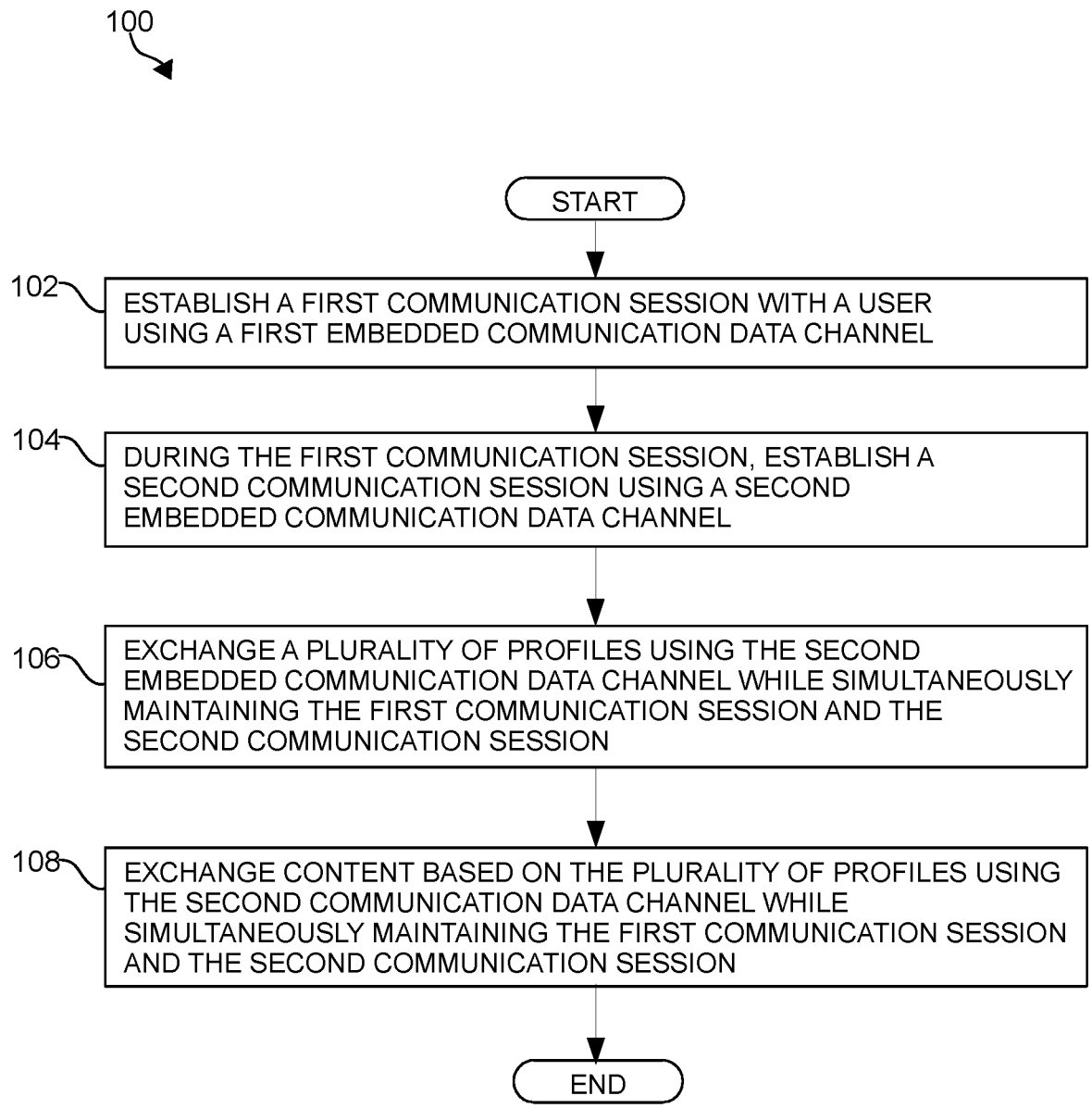
FIG. 1 illustrates a method for establishing a communication session for content delivery, in accordance with one possible embodiment.

FIG. 1 illustrates a method for establishing communication sessions for content delivery, in accordance with one possible embodiment. As shown, a first communication session is established with a user using a first embedded communication data channel. See step 102. In step 104, during the first communication session, a second communication session is established using a second embedded communication data channel. In step 106, a plurality of profiles is exchanged using the second communication data channel, wherein the plurality of profiles is associated, at least in part, with the user and with a content provider. Additionally, in step 108, while simultaneously maintaining the first communication session and the second communication session, content is exchanged based on the plurality of profiles using the second communication data channel. In various embodiments, the first communication data channel may be used for communication between a first entity and a second entity, and a second communication data channel may be used primarily for sending and receiving content and managing the use of media (e.g. ads, coupons, etc.).

In the context of the present description, an embedded communication data channel refers to a connection that allows for data communication. Additionally, the embedded communication data channel may include a plurality of channels for data communication, each of which may be used to provide one or more connections. In one embodiment, the one or more connections may be used to connect an end user to one or more of: another end user, a service provider, a content provider, and/or a combination of the end user, the service provider, and/or the content provider. Additionally, the embedded communication data channel(s) may use a wired or wireless medium. Further, in an embodiment, the embedded communication data channel may be heterogeneous (i.e. embedded communication data channel may use multiple mediums and/or multiple lower level protocols). For example, in one embodiment, the embedded communication data channel(s) may use, but not be limited to, one or more of cellular telephony, wired data network(s), and/or wireless data network(s).

Further, in the context of the present description, a communication session refers to any interchange of data. For example, such interchange may be a persistent or non-persistent session associated with a browser page or an application or browser script running on a processor at either end (e.g. client side, server side, etc.) of an embedded data communication channel. For example, in various embodiments, a communication session may include a transmission of data, where such transmission of data may be associated with an application or user request or response. As discussed herein, the interchange may be for purposes of establishing communication between a first entity and a second entity (e.g. in the case of first data communication channel), and/or the interchange may be for purposes of transferring and managing the use of media.

In the context of the present description, a profile denotes any information that identifies and/or characterizes a user or a content provider. Further, a profile may include, but not be limited to, an identifier, an address or type information, interests, preferences, capabilities and speed among other attributes. Further, in the context of the present description, content refers to any data that may be transmitted, including, but not limited to, audio or video content, data or meta-data, a webpage, etc. Content may be transmitted to a user by a provider and may include near real time (synchronous) or asynchronous data. Of course, it is appreciated that content may include any data type or form as commonly used by a person having ordinary skill in the art.

In one embodiment, the first communication session may occur in near real time. In the context of the present description, near real time may include a processing of data within a fraction of a second, or perhaps up to many seconds depending on the context of the communication. Additionally, the second communication session may further include establishing a direct connection between the user and the content provider using the second communication data channel. Further, while the first communication session occurs, the second communication session may also occur. Hence, the first communication session and the second communication may occur in real time.

In some embodiments, the first and/or second embedded communication data channel may be a peer to peer connection (e.g. closed network connection), and/or the second communication data channel may be used to create a bi-directional conversation (as will be described herein) in near real time, where the bi-direction conversation occurs between two entities (e.g. end user, server, etc.), such as between the user and the content provider. Additionally, the first communication data channel and the second communication data channel may each use a separate and different protocol. In another embodiment, the first communication data channel and the second communication data channel may each use a same protocol, such as wired, wireless, or a combination of wired and wireless.

Moreover, in one embodiment, the second communication session may include exchanging video data and audio data between a user and a content provider or an intermediary (e.g. ad agencies, third party ad pools, information sourced directly from external sources, etc.). Additionally, the content may include an advertisement. For example, a user may use a browser to navigate to a first webpage (thereby starting a first communication session). The user may interact via the website (or other communication media such as SMS/MMS, social media, messaging, speech recognition, chatbots, artificial intelligence platforms, etc.) such that a second communication session is commenced (e.g. such as through a chat interface on the website, or speech received through a listening interface, etc.). The second communication session may then use information about the user (e.g. user history, etc.) to target and deliver an advertisement that has been personalized based on a profile associated with the user. In this manner, the second communication session may be used to obtain information (e.g. user profile) on a user and then deliver a targeted advertisement based on the user profile.

In various embodiments, a user profile of the plurality of profiles may be aggregated based on at least two of: a user's viewing history, user preferences, a device associated with the user, an IP address, a device identifier, and a service provider associated with the user. Additionally, a device associated with a user denotes a device that a user or a user side application uses to create an embedded communication session, such as, but not limited to, a computer, cell-phone, and/or cable/connected TV box.

Still yet, in a further embodiment, during the first communication session and the second communication session, a user may seamlessly change (i.e. near real-time communication is maintained) from a first device to a second device (or any other number of devices). For example, a session may be migrated from a first device to a second device (e.g. using Chromecast, etc.). Additionally, any other virtual machine may be used to migrate the first communication session and/or the second communication session.

In the context of the present description, a service provider refers to a provider who delivers an end connection (i.e. last mile connection) to the user's device. In an embodiment, the plurality of profiles may include a content profile, wherein the content profile may be based on at least one of: content properties, user profile, user device, content availability, and bandwidth. Additionally, content property may include a bit-rate of the data, content format, content duration, and/or any other attributes of the content that may be exchanged with a user. Further, a user and content provider may exchange content profiles regardless of whether the content is consumed or used in some manner.

In some embodiments, the second communication data channel may occur ad hoc and be created prior to the bi-directional conversation. In the context of the present description, a bi-directional conversation is an exchange of data between two entities during a communication session. In one embodiment, the session may include data associated with one or more transactions. Such transactions may include transactions of a financial nature, but are not limited to those alone. Additionally, a bi-directional conversation may include an exchange of the plurality of profiles. Further, the bi-directional conversation may be used to generate one or more records, such as a call detail record ("CDR"). The one or more records may include data identifying information about the user, the user's device or device type, attributes of a data-flow during the bi-directional conversation (including bandwidth consumed and duration of transmission or duration of a session) and/or information associated with any transactions that occur as a part of the bi-directional conversation. Further, the one or more records may be created even in the event a bi-directional conversation faults, ceases prematurely, or changes from a bi-directional conversation to a one-sided transmission. In various embodiments, one or more records may be used to create a bill of charges associated with the second communication session.

Still yet, in an embodiment, the second communication data channel may be terminated after the completion of a bi-directional conversation by either party to the conversation. Additionally, the bi-directional conversation may be completed in response to either the user or the content provider communicating a completion request. The following description of the embodiment(s) is merely exemplary (illustrative) in nature and is in no way intended to limit the invention, its application, or uses. Additionally, the invention may be practiced according to the claims without some or all of the illustrative information.

Figure 2:
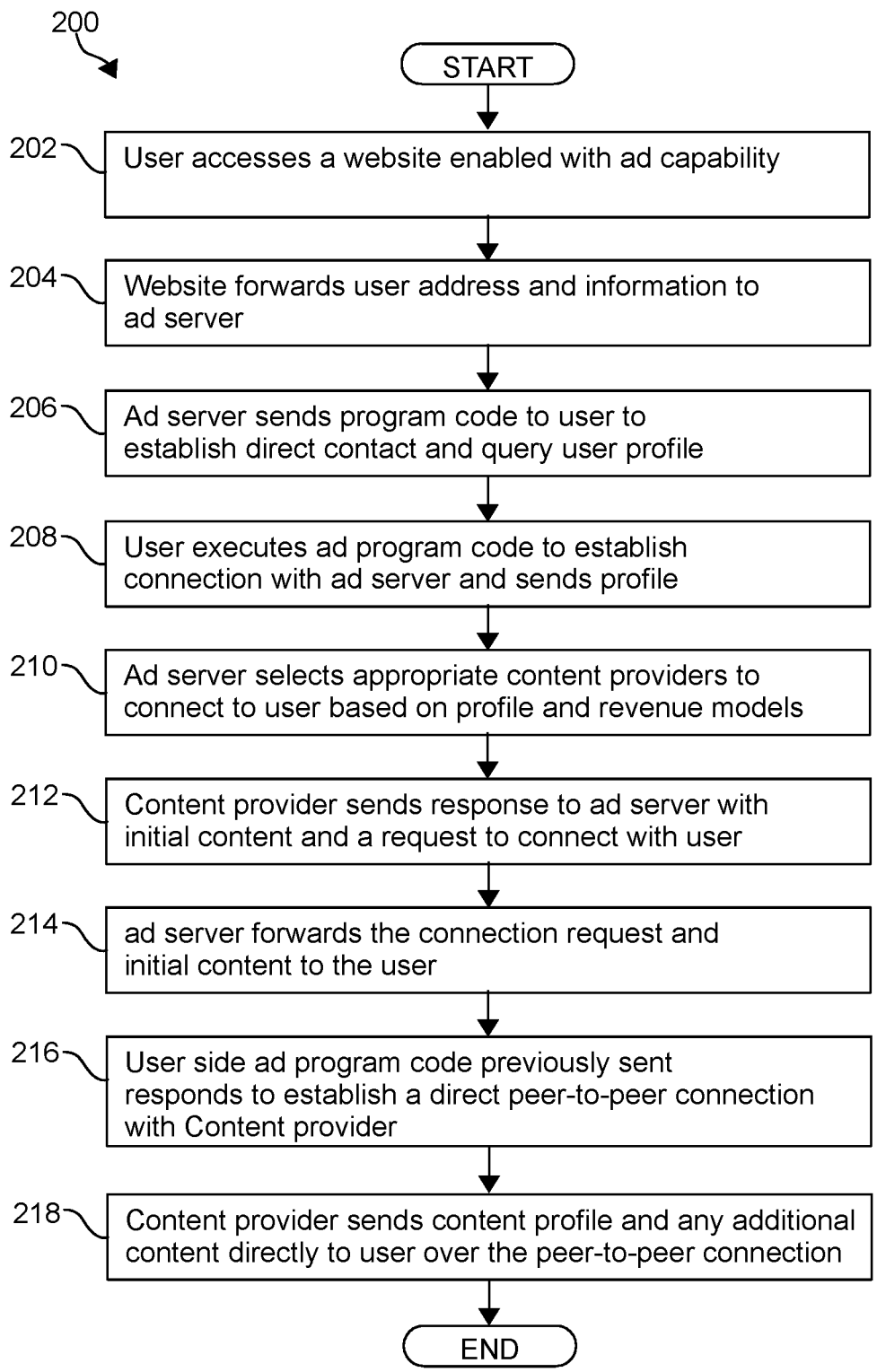
FIG. 2 illustrates a method for exchanging profiles and content over a peer-to-peer connection, in accordance with one possible embodiment.

FIG. 2 illustrates a method 200 for exchanging profiles and content over a peer-to-peer connection, in accordance with one possible embodiment. Optionally, method 200 may be implemented in the context of any of the foregoing figures.

As shown, operation 202 includes a user accessing a website enabled with an exemplary server (or a server with bi-directional conversation capabilities). Of course, it is to be appreciated that analogous server with bi-directional conversation capabilities may be used. In one embodiment, such accessing may be used to start a first communication session over a first embedded communication data channel.

In operation 204 the website accessed in operation 200 forwards user address and information to an exemplary server. In operation 206, the exemplary server may send program code to user to establish direct contact and query user profile. In one embodiment, operation 206 may occur using the first communication session. In operation 208, the user side receives program code to establish connection with the exemplary server and sends user profile. In one embodiment, operation 208 may occur using a second embedded communication data channel.

In operation 210, the exemplary server selects appropriate content providers to connect to the user based on the profile and one or more revenue models. For example, such revenue models may include charges for click-through, additional communication channels, direct sales, etc. In operation 212 the content provider may send a response to the exemplary server with initial content and a request to connect with user. In operation 214 the exemplary server may forward the connection request and initial content to the user. In one embodiment, operation 214 may occur using the second embedded communication data channel.

In operation 216 the user side program code previously sent (in operation 208) may be used to establish a direct peer-to-peer connection with the content provider. In one embodiment, operation 216 may be used to establish a second communication session over the second embedded communication data channel. In operation 218 the content provider may send content profile and any additional content directly to the user over the peer-to-peer connection. For example, content profile may include demographics, personal preferences, previous purchase, etc. and additional content may include SMS, MMS, coupons, social media/messaging, call to actions, etc. In one embodiment, operation 218 may occur using the second communication session. In one embodiment, sending content directly to the user may include sending a message or signal using the second embedded communication data channel.

Figure 3:
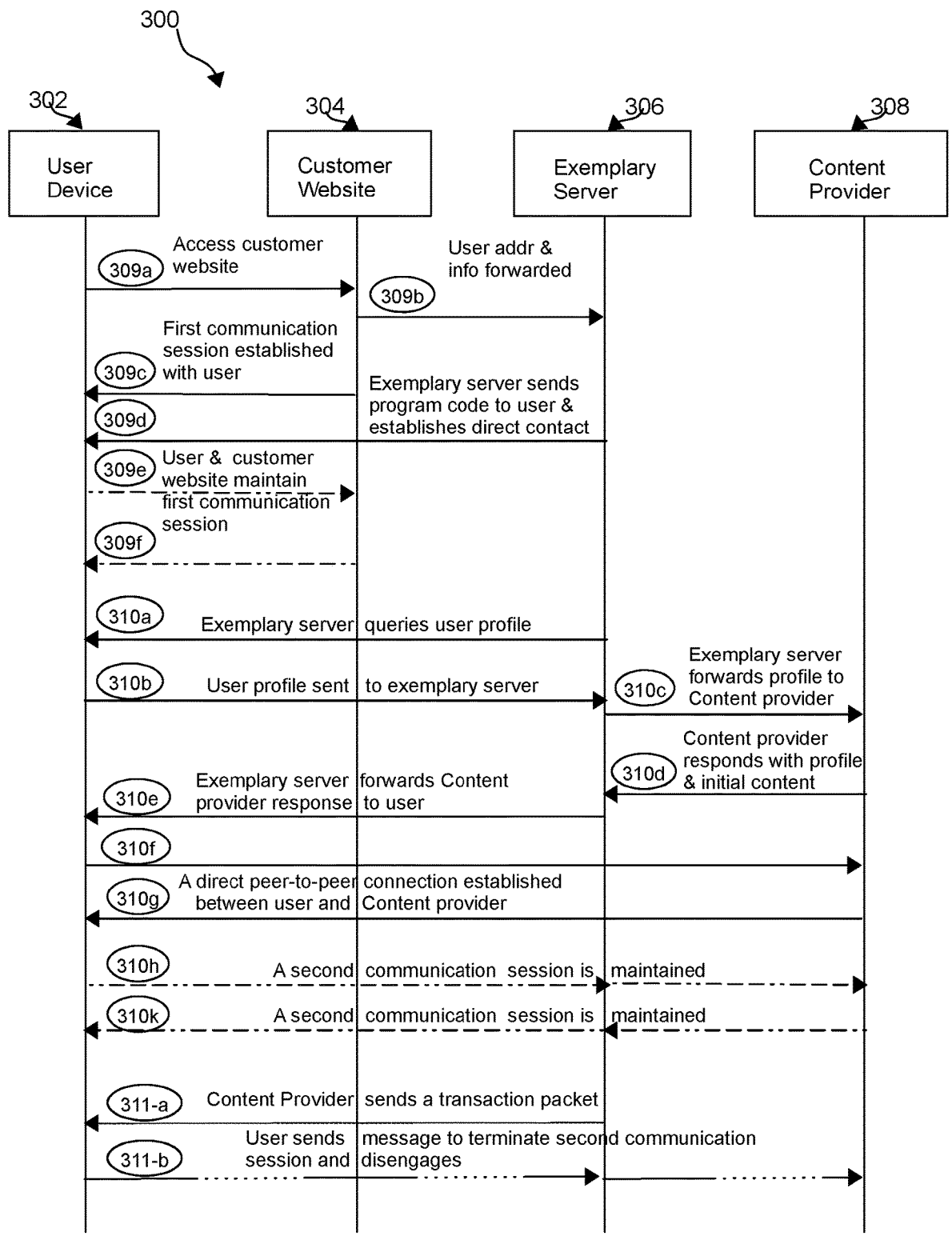
FIG. 3 illustrates a signal flow timeline for establishing communication sessions for content delivery, in accordance with one possible embodiment.

FIG. 3 illustrates a signal flow timeline 300 for establishing communication sessions for near real time content delivery, in accordance with one possible embodiment. Optionally, signal flow timeline 300 may be implemented, at least in part, in the context of any of the foregoing figures.

The signal flow timeline 300 starts when a user 302 accesses a website 304 (e.g. a customer website, etc.) using an invocation request 309a. In one embodiment, the website 304 may include a customer website. The website 304 may forward the user address and information to an exemplary server in 309b. In one embodiment, the website 304 may also send a response 309c to user to establish a first communication session. Such response 309c may occur using a first embedded communication data channel.

An exemplary server 306 may process the message 309b, and may respond via 309d by sending program code to the user 302 to establish a direct connection with the user 302. In one embodiment, the direct connection may occur using a second embedded communication data channel.

The user 302 and the website 304 may continue to maintain the first communication session over the first embedded communication data channel using one or more messages 309e and 309f.

An exemplary server 306 may then query user profile using query 310a and may receive a response 310b from the user 302 with user profile. An exemplary server 306 may forward this profile to a content provider 308 in 310c. Of course, content provider 308 may include one or more content providers.

Content provider 308 may respond with an address, profile, content profile and initial content. In one embodiment, the address, profile, content profile and initial content may be directly associated with the source of content provider 308 (for example, as in the case for a closed system). Additionally, the address, profile, content profile, and initial content may be sent using an exemplary server 306 (in response 310d). The exemplary server may then forward response 310d to user 302 (via forward 310e). In one embodiment, the forward 310e may occur using the second embedded communication data channel.

In response to forward 310e, user 302 may send 310f to directly establish a connection with content provider 308. In one embodiment, the connection may occur using the second embedded communication data channel to start a second communication session. Content provider 308 may respond with response 310g to maintain the second communication session. Once established, the second communication session may be maintained via a set of messages 310h and 310k. While maintaining the second communication session (e.g. via 310h, 310k, etc.), content provider 308 may send content to user 302.

In 311-a, content provider may send a transaction packet indicating termination of the second communication session. In response, in 311-b, the user 302 may send a message to content provider 308 to terminate the second communication session and to disengage. Of course, it is to be appreciated that the second communication may end without formally terminating the communication via 311-a and 311-b. For example, the connection with the user 302 may fault, causing the second communication session to be automatically terminated.

Additionally, in one embodiment, any of the messages 309e through 311-b may be repeated one or more times to establish, maintain, and terminate a plurality of second communication sessions even while the first communication session is maintained. Further, the user may maintain the first communication session while establishing, maintaining, and subsequently terminating a plurality of second communication sessions. For example, after completing a second communication session with a first content provider 308, an exemplary server 306 may select a second (or any number) content provider 308 for an additional (or any number) second communication session. Still yet, the user 302, while maintaining the first communication session, may establish a plurality of communication sessions over embedded communication data channels with a plurality of content providers.

Figure 4:
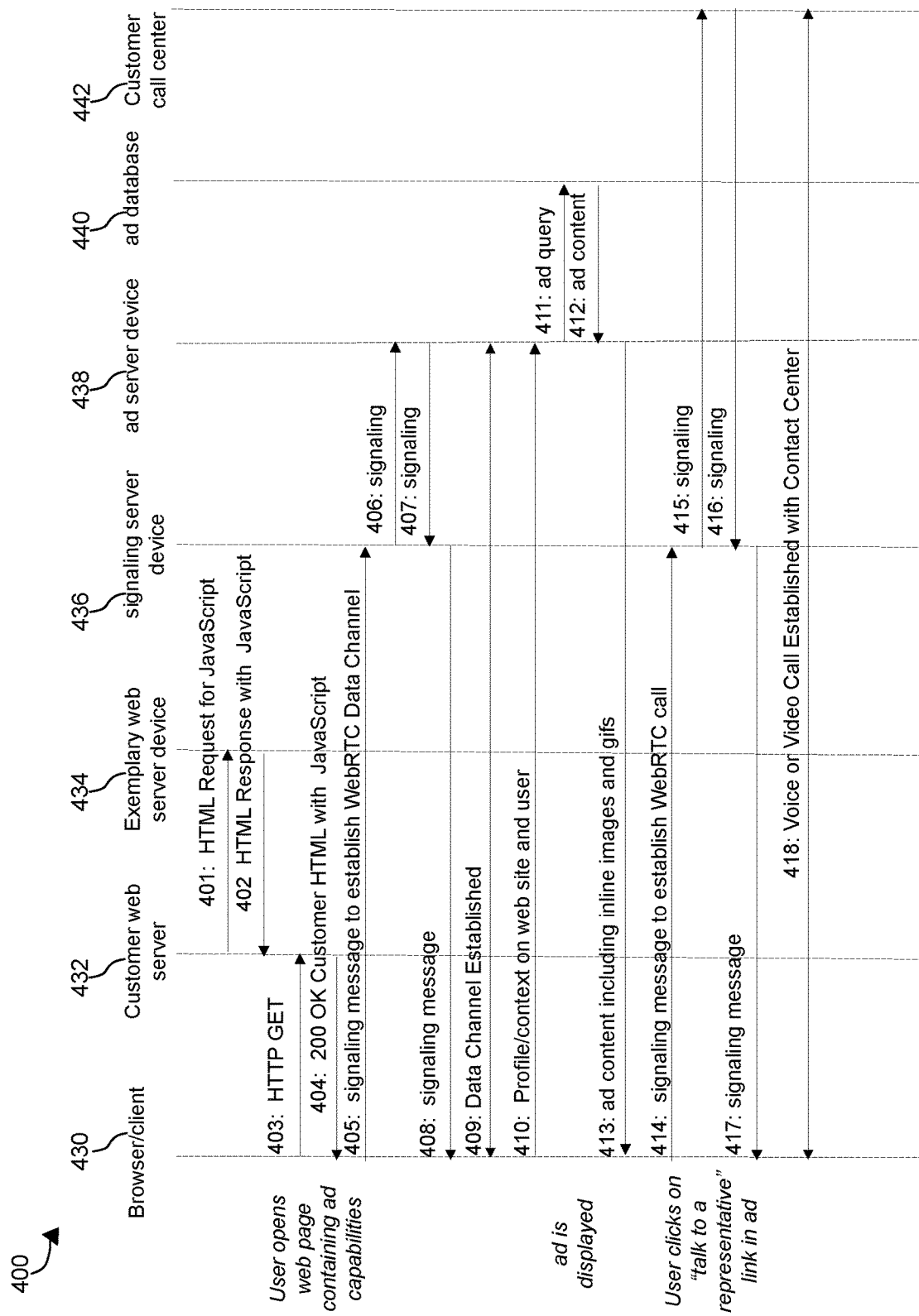
FIG. 4 illustrates a signal flow timeline for establishing a content delivery call, in accordance with one possible embodiment.

FIG. 4 illustrates a signal flow timeline for establishing a content delivery call, in accordance with one possible embodiment. Optionally, signal flow timeline 400 may be implemented, at least in part, in the context of any of the foregoing figures.

Signal flow timeline 400 begins with request 401 where a customer web server 432 sends an HTML request to an exemplary web server device 434 for an exemplary server JavaScript. In step 402, an exemplary web server device 434 sends the HTML response with an exemplary server JavaScript. It is to be appreciated that the signal flow timeline 400 is not limited solely to HTML requests and responses, but may include any of MMS, web sockets, SIP, OPUS, BONJOUR, and/or any other protocol which may be used for communication.

Next, a browser/client 430 may connect with a website employing customer web server 432, using HTTP get request 403. The customer web server 432 may reply to browser/client 430 via response 404 to the user with customer HTML and JavaScript, or any other program code that may be executed by the browser/client. Additionally, browser/client 430 may send a message 405 to a signaling server device 436 to establish WebRTC Data Channel. In one embodiment, WebRTC data channel may be used (per 405), although it is to be understood that other types of data channels (e.g. such as BONJOUR, SMS/MMS, SIP, MQTT, web sockets, etc.) as used in the art may also be used.

The signaling server device 436 may use message 406 to signal ad server device 438 and, in response, ad server device 438 may send a response signal 407 which may be forwarded by signaling server device 436 to browser/client 430 via signaling message 408.

Browser/client 430 may then send a confirmation 409 to ad server device 438 indicating that a data channel is established. Additionally, an acknowledgement from ad server device 438 may be sent also via confirmation 409. In one embodiment, the established data channel (indicating in 409) may include the second embedded communication data channel.

Browser/client 430 may then send user profile and website context information to ad server device 438 via request 410. The ad server device 438 may send an ad query 411 to the ad database 440 (or to a third party resource) and may receive response 412 with ad content. The ad server device 438 may send message 413 with ad content including inline images and gifs to browser/client 430.

In one embodiment, a conversation or transaction may be initiated (after step 413) with any party of interest (e.g. content provider, etc.). Such a conversation or transaction may be initiated via a signaling message 414 to signaling server device 436 to establish a WebRTC (or any near real time communication platform) call. Per message 415, signaling server device 436 may forward the signal to a customer call center 442, and the customer call center 442 may respond with signaling message 416, and signaling server device 436 may forward the signal to browser/client 430 via message 417. In this manner, a conversation or transaction 418 may be established between a browser/client 430 and the customer call center 442. In one embodiment, the conversation may occur as part of the second communication session. Additionally, the conversation may include a web chat, voice call, video call, etc.

Figure 5:
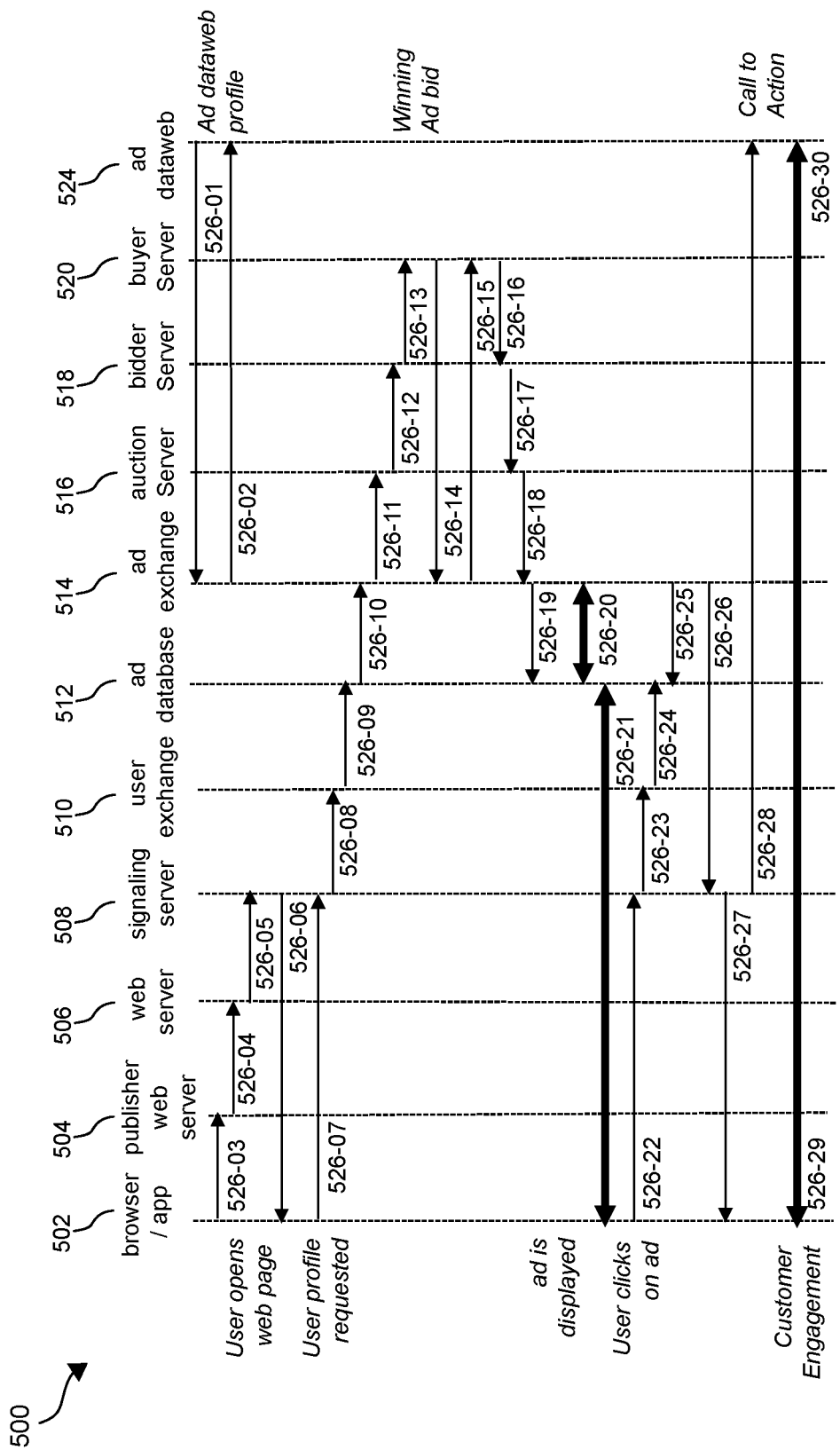
FIG. 5 illustrates a signal flow timeline for auction based content selection and delivery, in accordance with one possible embodiment.

FIG. 5 illustrates a signal flow timeline for auction based content selection and delivery, in accordance with one possible embodiment. Optionally, signal flow timeline 500 may be implemented, at least in part, in the context of any of the foregoing figures.

Signal flow timeline 500 begins with ad dataweb 524 sending one or more of ad profiles and/or preferences to an ad exchange 514 via one or more messages 526-01 and receiving one or more acknowledgements 526-02. In one embodiment, 526-01 and 526-02 may occur in advance of other steps found within signal flow timeline 500.

A user may open a web page using browser/app 502 by sending a request message 526-03 to connect with a publisher web server 504. In one embodiment, a browser/app 502 may send a request message 526-03 to connect with a publisher web server 504, which may in turn be enabled. Of course, it is to be appreciated that as discussed herein, a browser, application, and/or any other user interface system may be used to access and/or send/receive content.

Upon receiving a request message 526-03, the publisher web server 504 may send user information to web server 506 via a message 526-04. Web server forwards the message contents of 526-04 via signaling 526-05 to signaling server 508.

In response to 526-05 signaling server 508 may initiate a WebRTC call 526-06 to the user WebRTC client associated with browser/app 502. In response to WebRTC (or any real-time communication) call 526-06, the browser/app 502 may send a user profile to signaling server 508 using response 526-07, which is in turn forwarded by signaling server 508 to a user exchange 510 in message 526-08. The WebRTC information may be combined with publisher website information by the signaling server and sent to the user exchange 510 in message 526-08.

User exchange 510 may forward the combined information to an ad database 512 in message 526-09. This combined information may be construed, in one embodiment, as a bid. The ad database 512 may send the bid via 526-10 to an ad exchange 514.

Ad exchange 514 builds a request and communicates such request via a message 526-11 to an auction server 516. In one embodiment, the message 526-11 may include an OpenRTB message. The message 526-11 (including the request) is then published by the auction server 516. The auction server 516 forwards the request via message 526-12 to a bidder server 518 which ranks one or more bids from one or more buyers against the request (using, e.g., an OpenRTB framework) and the bidder server 518 selects a winning bid. The bidder server 518 may notify a winning bid to a buyer by sending a message 526-13 to buyer server 520 which may then send a request 526-14 to ad exchange 514.

The ad exchange 514 may obtain (e.g. from an ad agency or other third party resource, etc.) a selected ad associated with the winning bid (as based on the ad profiles from ad dataweb 524) and may initiate sending of this information through a series of messages 526-15 through 526-21 to the ad database 512. The ad database 512 then renders the selected ad in a page in the browser/app 502 using one or more messages (526-20 where content is received from ad exchange and sent to the ad database and 526-21 where content is sent from ad database to the browser/app).

During communication of messages 526-15 through 526-21, one or more records may be created by buyer server 520, bidder server 518, auction server 516 and ad exchange 514. For example, such records may include a session id, location, demographics, preferences, browsing history, etc.

In one embodiment, a user may respond and/or interact with the rendered ad in any manner. For example, clicking on the rendered ad may initiate further engagement with the ad database 512 and/or any of 514-520. Additionally, when the user responds to an ad a message 526-22 may be sent to signaling server 508 which may forward the message via 526-23 to user exchange 510 which in turn may look up user communication preferences and forward them to ad database 512 in a message 526-24. Message 526-24 may also be forwarded in a message 526-25 to ad exchange 514. For example, the additional information from the bid may be used to determine a communication path (and/or matching a profile to complete a transaction). In response, ad exchange 514 may respond via message 526-26 to signaling server 508. The signaling server 508 opens a path to browser/app 502 via message 526-27 and opens a path 526-28 to the ad dataweb 524. In this manner, a communication may be established (shown via 526-29 and 526-30 between the browser/app 502, the signaling server 508, and the ad dataweb 524). In one embodiment, the ad dataweb 524 may include an action station, wherein the action station may include a call center, a customer surveyor, an emergency or other service provider, etc.

Figure 6:
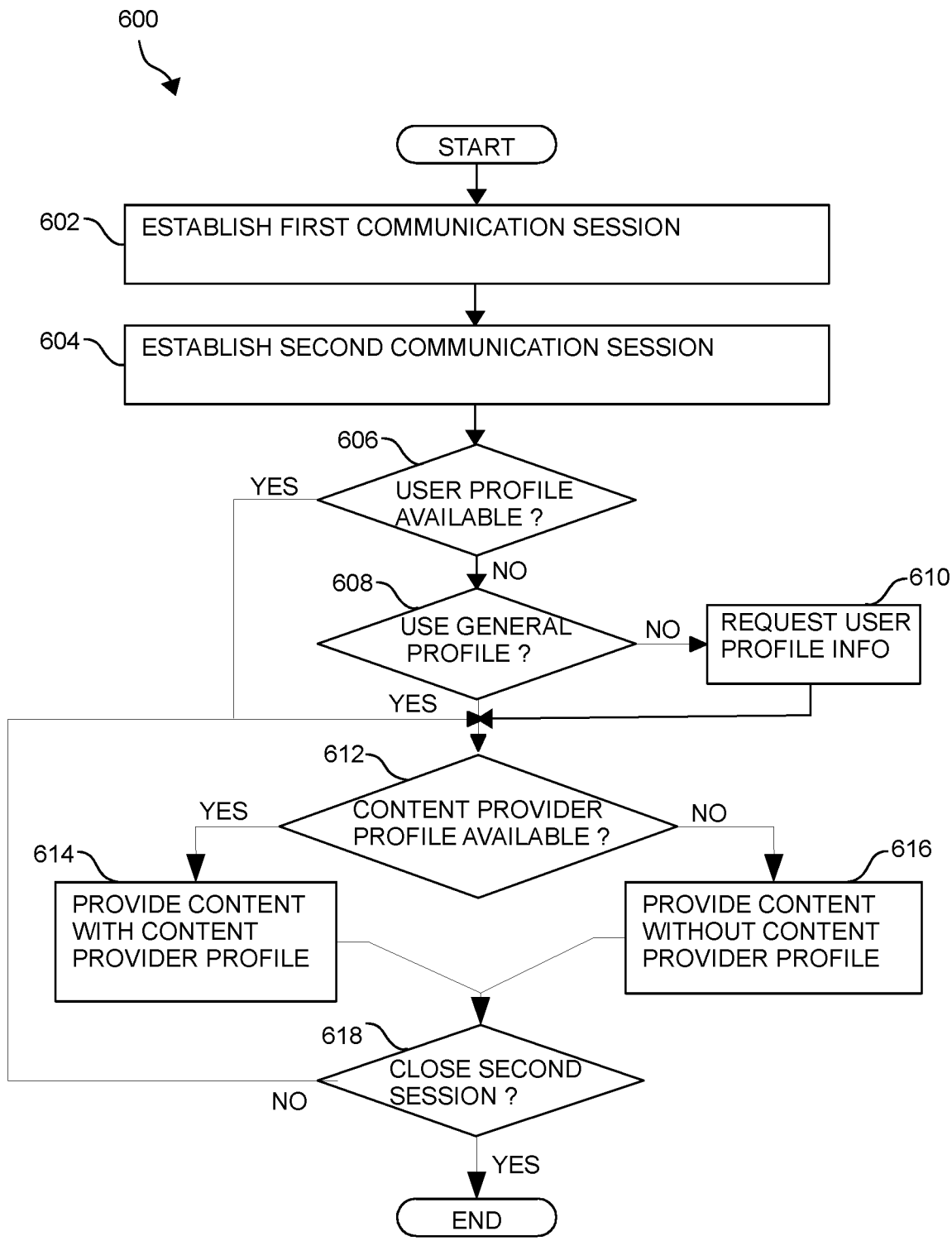
FIG. 6 illustrates a method for exchanging profiles and content, in accordance with one embodiment.

FIG. 6 illustrates a method for exchanging profiles and content, in accordance with one embodiment. Optionally, method 600 may be implemented in the context of any of the foregoing figures.

Method 600 begins when a user accesses a website enabled with capability. In operation 602, a first communication session over a first embedded communication data channel is established. Next, in operation 604, a second communication session is established over a second embedded communication data channel.

In decision 606, it is determined whether a user profile is available. If user profile is available then decision step 608 proceeds to decision 612. If user profile is not available then in decision 608 it is determined whether to use a general profile (e.g. for the user). If affirmative, then the method proceeds to decision 612. Else, in operation 610 a user profile is requested and obtained.

In decision 612, it is determined if content provider profile is available. If content provider profile is available then in operation 614, content is provided with content provider profile. Else, in operation 616 content is provided without content provider profile.

After completion of any conversations and any transaction a decision is made in decision step 618 to maintain or close the second communication session. If the session is not completed, then the method returns to decision 612. If the session is completed, then the session is ended. In an alternative embodiment (not shown), if the session is completed, then a decision may occur where it is determined whether an additional communication session should be established. If so, then the additional communication session would follow similar steps as 608-612 as applied to the additional communication session. In this manner, additional communication sessions may be additionally initiated and established as desired and thereafter terminated after use.

Figure 7:
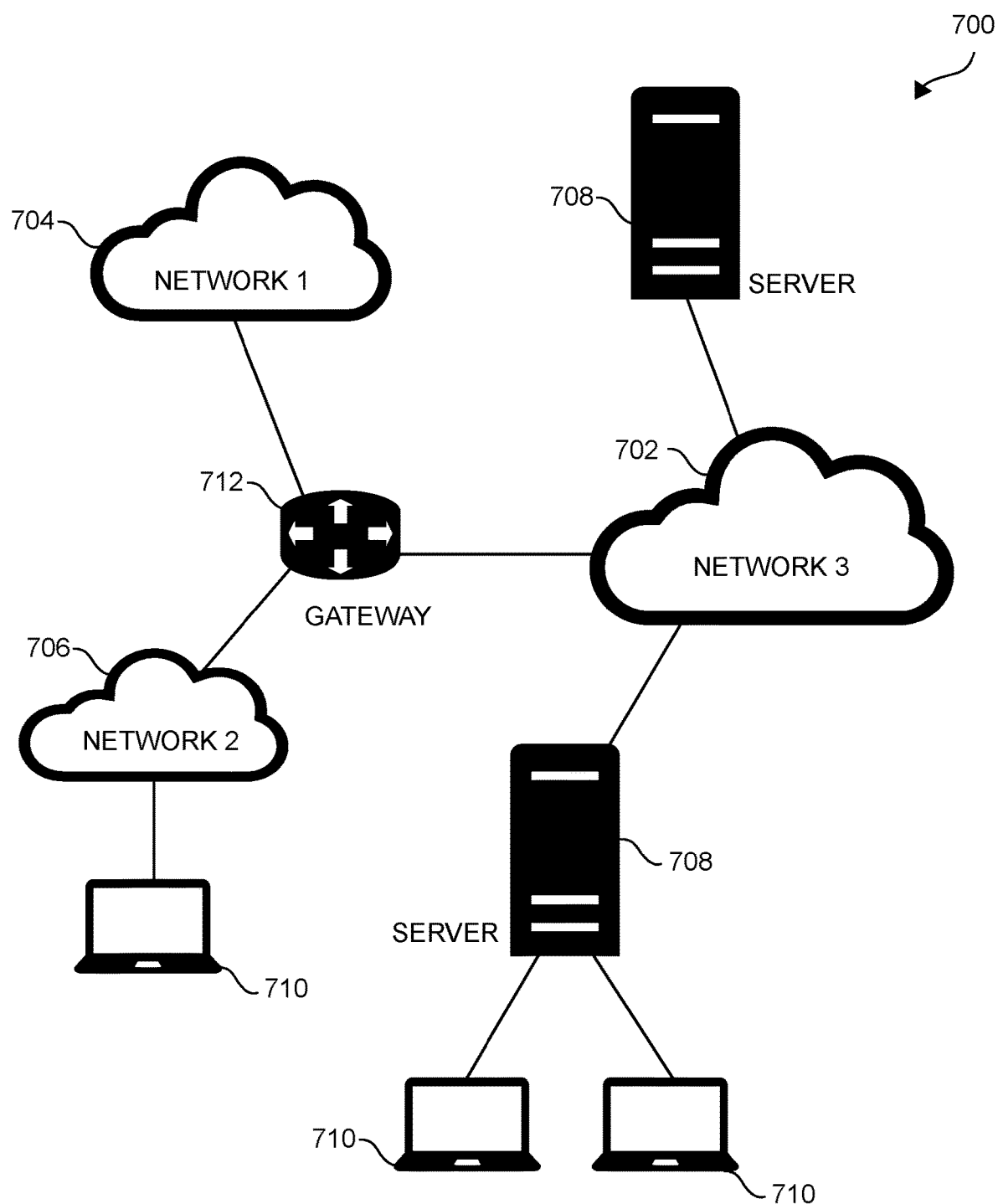
FIG. 7 illustrates a network architecture, in accordance with one embodiment.

FIG. 7 illustrates a network architecture 700, in accordance with one embodiment. As shown, a plurality of networks, Network 1 704, Network 2 706, and Network 3 702, are provided. In the context of the present network architecture, the networks, Network 1 704, Network 2 706, and Network 3 702 may each take any form including, but not limited to a local area network (LAN), a wireless network, a wide area network (WAN) such as the Internet, peer-to-peer network, etc. Additionally, such networks may include a RFID communication between Client 710 and another device (e.g. wearable, cloud, tag, etc.). Further, such networks may include any peer to peer (P2P) or device to device communication. In the context of the present description, a client may include an end user computer, a desktop computer, a laptop computer, a mobile device, a mobile phone, a tablet, a personal digital assistant (PDA), a television, a set-top box, a chat bot, a social media platform, an artificial intelligence platform, etc.

Coupled to the Network 3 702 is one or more Server 708, which is capable of communicating over the Network 3 702, as well as any other applicable network (e.g. Network 1 704, Network 2 706, etc.). Also coupled to Network 2 706 and Network 3 702 (or any other applicable network) and the Server 708 is a plurality of Client 710. Such Server 708 and/or Client 710 may each include a desktop computer, lap-top computer, hand-held computer, mobile phone, portable device, personal digital assistant (PDA), peripheral (e.g. printer, etc.), any component of a computer, and/or any other type of logic. Additionally, although not shown, Server 708 and/or Client 710 may include an artificial intelligence platform, a speech recognition platform, a chat-bot, a set-top box, a TV, etc. In order to facilitate communication among Network 1 704, Network 2 706, Network 3 702, and/or any other network, at least one Gateway 712 is optionally coupled there-between. In the context of the present description, cloud refers to one or more servers, services, and/or resources which are located remotely.

Figure 8:
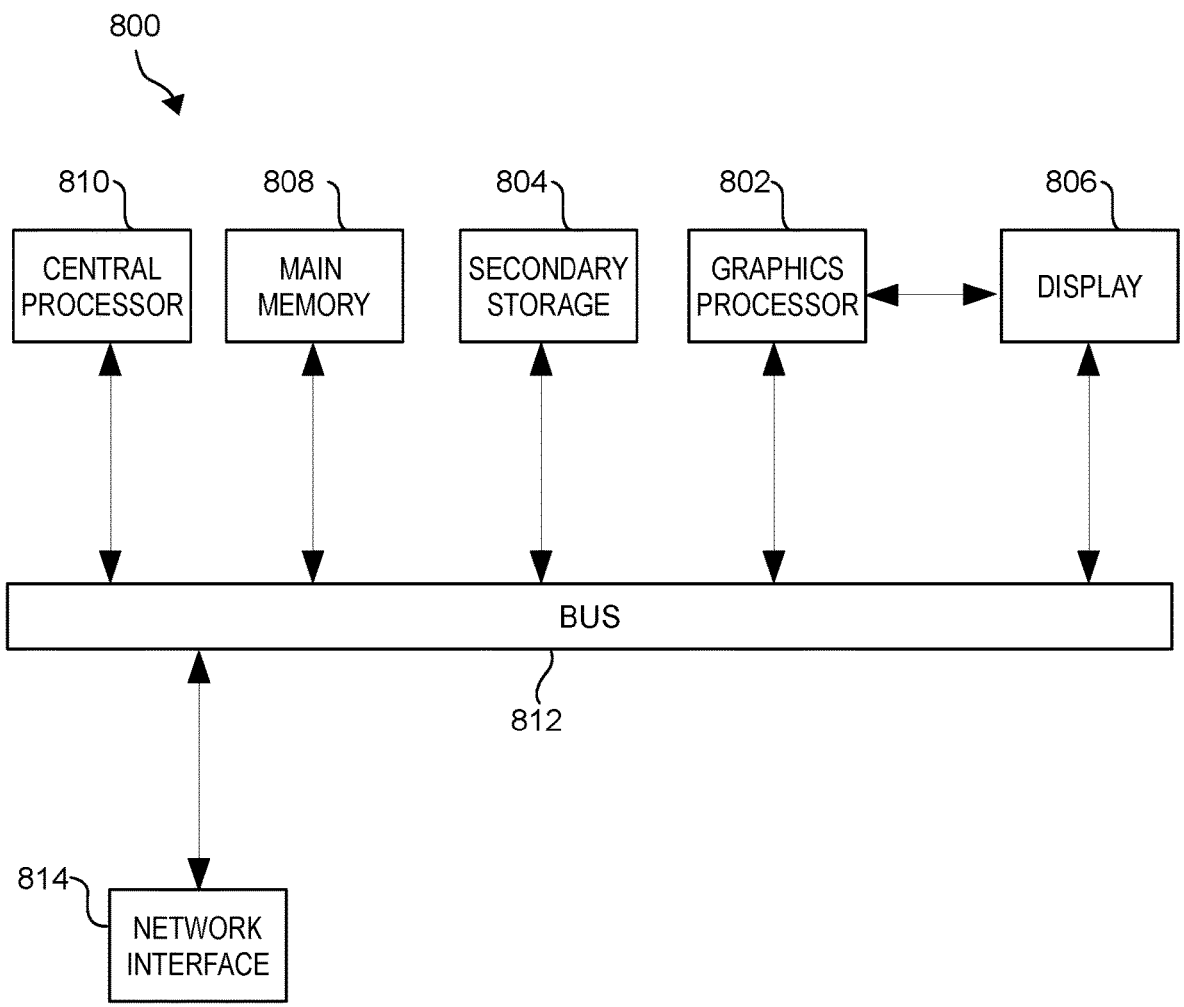
FIG. 8 illustrates an exemplary system, in accordance with one embodiment.

FIG. 8 illustrates an exemplary system 800 in which the various architecture and/or functionality of the previous embodiment and/or subsequent embodiments may be implemented. As shown, a system 800 is provided including at least one host Central Processor 810 which is connected to a Communication Bus 812. The system also includes a Main Memory 808. Control logic (software) and data are stored in the Main Memory 808 which may take the form of random access memory (RAM).

The system also includes a Graphics Processor 802 and a Display 806, i.e. a computer monitor. In one embodiment, the Graphics Processor 802 may include a plurality of shader modules, a rasterization module, etc. Each of the foregoing modules may even be situated on a single semiconductor platform to form a graphics processing unit (GPU). In another embodiment (but not shown in FIG. 8), content may use a transcoder to convert content from a first form (file type, size, etc.) to a second form.

The system may also include a Secondary Storage 804. The Secondary Storage 804 includes, for example, at least one of a non-volatile memory (e.g. flash memory, magneto resistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the Main Memory 808 and/or the Secondary Storage 804. Such computer programs, when executed, enable the system to perform various functions. The Main Memory 808, the Secondary Storage 804 and/or any other storage are possible examples of computer-readable media. Further, the bus 812 may be connected to Network Interface 814.

In one embodiment, the architecture and/or functionality of the various previous figures may be implemented in the context of the host Central Processor 810, Graphics Processor 802, an integrated circuit (not shown) that is capable of at least a portion of the capabilities of both the host Central Processor 810 and the Graphics Processor 802, a chipset (i.e. a group of integrated circuits designed to work and sold as a unit for performing related functions, etc.), and/or any other integrated circuit for that matter.

Additionally, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, a laptop computer, a server computer, and/or any other type of logic. Still yet, the system may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, and/or any other portable computing device.

Further, the system may be coupled to a network (e.g. a telecommunications network, local area network (LAN), wireless network, wide area network (WAN) such as the Internet, peer-to-peer network, cable network, etc.) for communication purposes. As an example, any of the Network 1 704, Network 2 706, and/or Network 3 702 may be used for such coupling (and/or in combination with Network Interface 814).

Figure 9:
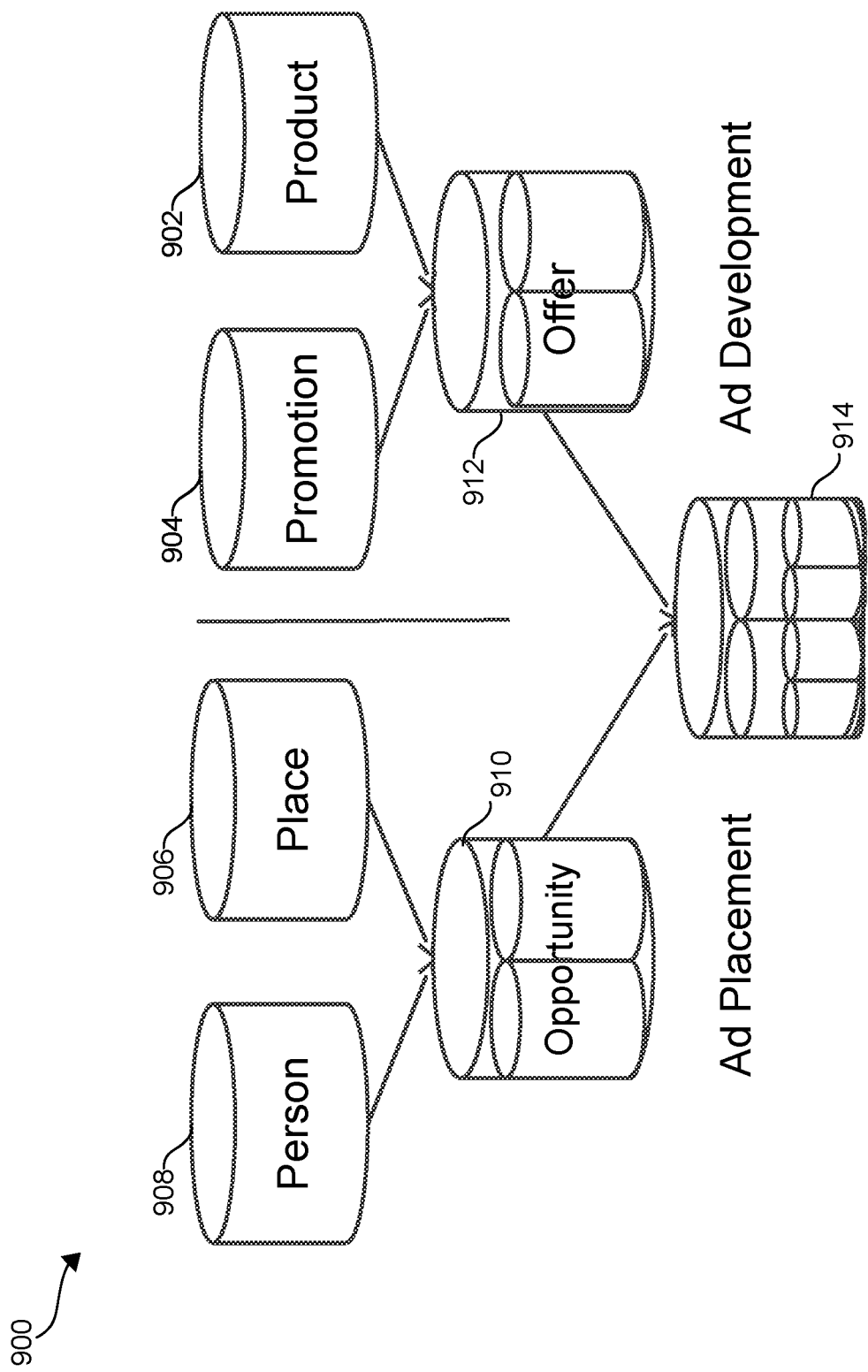
FIG. 9 illustrates a scheme of content sources associated with an ACDR, in accordance with one embodiment.

FIG. 9 illustrates a scheme 900 of content sources associated with an ACDR, in accordance with one embodiment. Optionally, scheme 900 may be implemented in the context of any of the foregoing figures.

As shown in FIG. 9, the scheme 900 bonds end user identities to self-identified preferences. In this scheme 900, one or more pools of products 902 are created. Additionally, one or more pools of promotions 904 are created. Both of products 902 and promotions 904 may be associated with an ad development platform and may be used to create one or more offers 912. In the context of the present description, an ACDR refers to an enhanced caller detail record.

Further, one or more pools of persons 908 with known profiles are created and matched to a collection of locations and/or places 906. Such locations and/or places may include geographical locations, web locations, and/or virtual or real-world communities of interest. Both of persons 908 and locations and/or places 906 may be used to create one or more pools of opportunities 910. In one embodiment, opportunities 910 may be used to monetize information associated with persons 908 and/or locations and/or places 906.

In one embodiment, products 902 may be promotions 904 and one or more offers 912 may be created. For example, various sports related products may be matched to various sports events and appropriate product offerings and discounts may be created via offer 912. Additionally, offers 912 may be used to drive ad development while opportunities 910 may determine ad placement in a page. an exemplary server capabilities match offers 912 with opportunities 910 in a rendering of content 914. In one embodiment, content 914 may be presented during a web or application based embedded communication session.

In one embodiment, an ad service delivery system may enable users and advertisers to share preferences and develop trusted experiences while enabling better communication solutions (via embedded communication data channels). In this manner, the interests and opportunities of the user may be matched to offers associated with content from an advertiser.

In another embodiment, end user identities may be associated with self-identified preferences using near real time communications systems. For example, such association may enable information to be bonded through a policy rules system such that end users, publishers, service providers and advertisers may optimize ads relevancy, placement and delivery. In this manner, more meaningful dialogue may be achieved.

Moreover, in some embodiments, ads may be displayed within a WebRTC client using the communications path (e.g. first communication session and second communication session) to send the ads as if they were call requests. If an ad does not generate a reply the ad may be treated like a "no answer" and the Ad service delivery system may repeat the process. The end user, when seeing an ad which is not relevant to the user, may choose to mark a do-not-display marker for that specific ad and/or ad source. In this manner, content associated with ads may be personalized by the user.

In one embodiment, analytics may be used to gather data targeting, such as through pattern recognition and generalized logic. Additionally, end users may tailor interaction with the ad service delivery system by enabling or restricting communication based on user preferences. In some embodiments, the analytics may be associated with an individual call flow without impacting any restrictions on privacy. For example, analytics may be gathered in a manner consistent with permission based actions, and/or in a manner that preserve the anonymity of the user Further, ads may be made available to/from third party communication systems (e.g. ad agencies, direct contact center systems, other third parties, etc.). Additionally, triggers may be associated with the third party communication system such that one or more responses may be automatically sent based on a trigger (e.g. an action by a user, a request by a browser/app, a threshold of profile information, etc.).

Still yet, in one embodiment, using a near real time communications client (e.g. such as WebRTC) may be used to provide an embedded continuity in communication. For example, such communication systems for advertising may be enabled to allow receipt of call delivery and/or a call detail records, which may in turn be applied to selecting more pertinent advertising (and/or other personalized services).

In one embodiment, if the end user is unknown (or if the user is using a non WebRTC system), the website or media associated with that particular communication methodology may access the ad service delivery system to discover user preferences to better analyze the relationship of any ad placement (as described hereinabove in FIG. 4).

In some embodiment, once an end user indicates interest, an Ad service delivery system may use one or more advertisers' ad profiles and an embedded communication system to directly connect one or more ads. For example, call-to-action services such as contact centers, order processing centers, and/or survey systems may be used to connect to an end user, etc. Further, ads which may include a click-to-call or click-to-video action may include a preferred media type (audio, video, and/or text messaging), along with any other internet related routing information (e.g., SIP trunk, Skype ID, PSTN telephone number, etc.).

In some embodiments, currently closed type systems (such as private publishers, local affinity networks, organization/communication systems, etc.) may be opened up by enabling a bi-directional conversation (e.g. such as one employed within the context of FIG. 4). Furthermore, some context information may be included in the message 414 of FIG. 4 with additional signaling information that may be routed to a contact center. In one embodiment, if a gateway is used, the context information may be carried as user-to-user Information (UUI) over a Public Switched Telephone Network (PSTN) or Integrated Switched Digital Network (ISDN), allowing for call context information on an ad to be conveyed even when a call is not end-to-end over Internet Protocol (IP).

In an embodiment, in order for a complete transaction to be available for analysis, an ad service delivery system may remain active in a browsing session on a site and any links from that site may remain active (such as contact center communication, adjunct sales, order delivery preferences, etc.). Additionally, an ad service delivery system may act as an HTTP Proxy between a browser and an ad website. For example, HTTP requests may be sent to an ad service delivery server that would then fetch the information. Further, an ad service delivery server may rewrite all HTTP URLs such that requests are specifically sent to such ad service delivery server.

In yet another embodiment, a user input may be sent over a data channel to an ad service delivery ad server, where it may be interpreted as a click or a mouse-over event, which may cause new HTML to be pushed or scripts executed. Additionally, a user input may be detected by an ad service delivery script that may then report any information (such as request for specific ad blocking, chat requests, bookmarking, call to actions, etc.) to an ad service delivery server. This may be achieved by making a modification to a site. Moreover, such reporting may occur in near real time.

In an embodiment, an ad service delivery server may generate a series of records, such as call detail records (CDR), or an analogous record. Such CDR records may be used to generate ad billings based on an actual outcome (e.g. serving of ad, etc.) and/or use.

In some embodiments, even if an end user's browser does not support WebRTC or if an end user is unknown, it may still be possible to support ad services and render at least some of the information offered through an ad service delivery system. For example, if a WebRTC protocol is not supported, instead of establishing a data channel, a websocket may be established between a browser and an ad service delivery server. If a click-to-call is activated, a PSTN call-back may be initiated. The phone number to use may be selected from the user's profile or the user may be prompted for a call-back phone number. For a click-to-callback functionality, an ad may include a URL such that the ad delivery service system may send the user-provided callback telephone number to an advertiser who may directly initiate a callback. The advertiser may then initiate a callback to the user using the number provided.

In the context of a social network, in one embodiment, an ad service system may manage use of hyperlinks in a manner that integrates a communication model into an advertising model. Such may be used to improve call-to-action services and better analytics. For example, this may be accomplished by rewriting one or more URLs in an ad to point to one or more ad service delivery servers such that any clicks or interactions via the social network may be logged by an ad service delivery server.

In one embodiment, the manner and location of ad placement may be determined or effected using preferences shared by a user, which may in turn increase a value of a placement of an ad (as it is more directly aligned with the preferences). Furthermore, an optimized communication path may be utilized to complete one or more sales. For example, bids by ad content providers for a particular user(s) may be determined to be of a higher value than for an average demographics in a market, in which case the ad content providers may accordingly increase their bids based on the context of the user and/or market.

In some embodiments, a method may be used to make an end user's experience more self-directed such as by order of desired communication paths, social media/messaging preferences, etc. Such a self-directed experience may allow an advertisement to enable one or more rich media experiences directly involving the end user (e.g. users may be enabled to redirect to their personal preference of media, such as Alexa/Siri/Google Voice, etc.). Additionally, news organizations and other community-based systems may be enabled to utilize the methods disclosed hereinfore delivering education, news, surveys and socialized content. Users may be allowed to optimize their ad service delivery experience by changing settings associated with their profile. Furthermore, in other embodiments, additional capabilities (such as an enrichment of advertisements) may be used to enable direct communication and feedback. Additionally, analytics and notifications may be used to better analyze outcomes.

Still yet, in one embodiment, one or more profiles may be used to match criteria and communication profile preferences between users and content publishers. Furthermore, ad placement may match the interest and attention of users with advertiser's objectives. For example, this may be accomplished by using an Advertising Detail Record (ADR) generated by each advertisement that provides structured datasets. These databases may be used to form aggregate data information sets or may be used for specific analysis of customer interactions. Each ADR may be created by gathering analytical profile details including, but not limited to, impressions, demographics, experiences, and resolutions.

In one embodiment, at the initiation of an interaction with or without an embedded client being rendered on a website or a mobile application, a communication path may be established using signaling tools (e.g. web sockets, SMS/MMS, MQTT, etc.) to transmit the available demographics of a website or mobile application to an ad service delivery system. Additionally, method described herein may be used to advertise with bots, surveys, and/or embedded analytics to optimize engagements.

Still yet, methods disclosed herein may be used to establish an advertising exchange where ads may be served to embedded WebRTC clients on third-party websites as well as on mobile applications. Such ads may be delivered in rotation based on customer analytics and/or preferences. Additionally, if a user finds an ad engaging then having a bi-directional conversation (using an embedded communication protocol such as WebRTC) may allow for the ad provider to follow up with the user directly without having to leave a website of interest. Such may further enable advertisers to use existing media assets in a mobile and online world in a more direct and comprehensive manner.

With respect to media type, audio, print, and video are all capable of being delivered in a session format. Additionally, such may be delivered in time formats with call to action forwarding or conferencing capability. As such, each ad may be constructed as a uniform resource identifier (URI) (as a session ID) including a Call-to-Action (including a forwarding capability), whereby an interested party may be directed to a call center, a website or an application.

In some embodiments, user experience utilizing a data channel may be matched to a profile. Additionally, contextual advertising proximity, and other factors (such as device types, speech recognition such as SIRI/Alexa/Google Voice, smart home elements, IOT considerations, car consoles, smart TVs, etc.) may be referenced in determining ad placement.

In one embodiment, artificial intelligence, machine learning, deep learning, and analytics may be used to combine information associated with a subscriber and contextual awareness (e.g. how/when/where a user access the web/application). Such contextual communication with near real time analytics may be used to drive ad appearance and placement.

Additionally, in another embodiment, a session profile may be created that gathers pertinent information about a device being used, an end user's preferences based on a selection of one or more webpages or applications, along with any previously known information about the end user. If a user is known (e.g. from previous experiences), the session profile may be augmented with additional information about media/communication preferences and any other devices available.

In one embodiment, any available session information may be communicated to an exemplary server and may be used to determine one or more primary and one or more secondary preferences for media. Further, an exemplary server may gather additional resources and/or sessions information which may then be shared with an exchange network looking for resources (and which may choose to participate in the ad placement session(s)). Additionally, third party or internal media resources may be queued by an exemplary server to provide an end user with opportunities to select areas of interest. Moreover, each of the media resources (e.g. audio, video, etc.) may have their own respective session profiles with preferences on media and staging methodology which may also be stored by the an exemplary server system.

In some embodiments, an exemplary server system may bridge the session(s) in a queue with one or more end user session(s). For example, a call detail record may be used with each invitation to bridge such session(s). Further, an end user session profile may include negative or null experiences which may influence the session(s). In view of such, any interaction of the end user with the bridge sessions may be timed out, rejected or accepted (based on the call detail record, end user session profile, etc.). If the bridged sessions time out or are rejected, an additional resource may be selected to be connected to the end user(s). If no other resources are available, the exemplary server system may initiate a new request to an information exchange. If no other resources are available internal information resources may be utilized. If an end user accepts an information resource, the exemplary server system may signal an acceptance by the end user to the information resource.

In one embodiment, with the acceptance of a session by an end user, an exemplary server system may compare an end user session profile with an information resource profile and determine a communications flow. If an end user has no preferences or there is not a match, the information resource profile may be used as a default media method. For example, assuming that an information resource wants to render a coupon before completing a connection to a contact center, that the preference is an image of the coupon with accompanying text, and that the end user phone number is unknown, then the coupon may be displayed simply as text, since a user profile cannot be ascertained and user device type would be unknown.

In a further embodiment, a default preference is used. In another embodiment, if an end user profile comprises multiple devices and media preferences, a server may target multiple matching devices. For example, if an end user is on the web and a web session is opened on a desktop, and assuming that the end user's smartphone is also known, then a coupon may be sent by text message to the smart phone, in addition to displaying an image of the coupon in the web session. This may be used to increase the likelihood of future use regardless of how a specific session ends. Further, in one embodiment, if an end user accepts the coupon, a contact center may be bypassed and the end user may be taken directly to an order form to complete a transaction.

Still yet, a call detail record may be augmented with a completion report. For example, the record may be augmented to include keywords, tagged preferences, time stamps, etc. In some embodiments, the call detail record may be parsed and shared with an application or webpage publisher.

Of course, the various embodiments set forth herein may be implemented utilizing hardware, software, or any desired combination thereof. For that matter, any type of logic may be utilized which is capable of implementing the various functionality set forth herein.

While specific embodiments of the invention have been described, it is understood that the present invention is not intended to be limited only to such embodiments. Additionally, the scope of the preferred embodiment should be defined by the following claims and their equivalents. Moreover, any combination of the above-described elements in all possible variations thereof is encompassed unless otherwise indicated herein or otherwise clearly contradicted by context. Further, the use of the terms "a" and "an" and "the" and similar referents in the context of describing the subject matter (particularly in the context of the claims) are to be construed to cover both the singular and the plural, unless otherwise indicated herein or clearly contradicted by context. No language in the specification should be construed as indicating any non-claimed element as essential to the practice of the invention as claimed.

What is claimed is:

1. A method comprising:
    establishing a first communication session with a user using a first embedded communication data channel;
    during the first communication session, establishing a second communication session using a second embedded communication data channel, wherein:
        the first embedded communication data channel involves a first communication protocol; and
        the second embedded communication data channel involves a second communication protocol different from the first communication protocol and the second communication protocol uses a real time protocol;
    exchanging a profile based on establishing the second embedded communication data channel, wherein the exchanged profile is associated, at least in part, with the user and with a content provider, wherein the exchanged profile includes use information about the user and at least one of: an identifier, an IP address, an interest, a preference, a capability, a device, a device identifier, a service provider, and a network speed; and
    while simultaneously maintaining the first communication session and the second communication session, exchanging content with the user based on the exchanged profile, wherein:
        the exchanged profile includes information about the user;
        the exchanged content includes an advertisement;
        the second embedded communication data channel is used to create a bi-directional communication between the user and the content provider; and
        the second embedded communication data channel is created prior to the bi-directional communication between the user and the content provider and is terminated after a completion of the bi-directional communication.

2. The method of claim 1, wherein the advertisement of the content is exchanged using the second embedded communication data channel and the content includes at least one of: an audio content, a video content, metadata, and a webpage.

3. The method of claim 1, wherein the second communication session further includes establishing a direct connection between the user and the content provider using the second communication data channel.

4. The method of claim 1, wherein one or more of the first communication session and the second communication session occur in near real-time.

5. The method of claim 1, wherein the second communication data channel is a peer to peer connection.

6. The method of claim 1, wherein the content includes at least one of video data and audio data.

7. The method of claim 1, wherein the content provider is an intermediary.

8. The method of claim 1, wherein the profile is a combination of information from multiple sources.

9. The method of claim 8, wherein the profile is a user profile and is an aggregate of information of at least two of: a viewing history associated with the user, a user preference, a device associated with the user, an IP address, a device identifier, and a service provider associated with the user.

10. The method of claim 1, further comprising:
using the bi-directional conversation to generate one or more records storing information about the second communication session.

11. The method of claim 1, wherein the bi-directional conversation is completed in response to either the user or the content provider communicating a completion request.

12. The method of claim 1, wherein the near real time includes synchronous data.

13. The method of claim 1, wherein:
the content is exchanged with an auction server and the auction server is in communication with a bidder server which ranks and selects one or more bids; and
the one or more bids include at least the advertisement of the exchanged content.

14. A device comprising:
a non-transitory memory storing instructions; and
one or more processors in communication with the non-transitory memory, wherein the one or more processors execute the instructions to:
establish a first communication session with a user using a first embedded communication data channel;
during the first communication session, establish a second communication session using a second embedded communication data channel, wherein:
the first embedded communication data channel involves a first communication protocol; and
the second embedded communication data channel involves a second communication protocol different from the first communication protocol and the second communication protocol uses a real time protocol;
exchange a profile based on establishing the second embedded communication data channel, wherein the exchanged profile is associated, at least in part, with the user and with a content provider; and
while simultaneously maintaining the first communication session and the second communication session, exchange content with the user based on the exchanged profile, wherein:
the exchanged profile includes information about the user;
the exchanged content includes an advertisement;
the second embedded communication data channel is used to create a bi-directional communication between the user and the content provider; and
the second embedded communication data channel is created prior to the bi-directional communication between the user and the content provider and is terminated after a completion of the bi-directional communication.

15. The device of claim 14, wherein the advertisement of the content is exchanged using the second embedded communication data channel and the content includes at least one of: an audio content, a video content, metadata, and a webpage.

16. The device of claim 14, wherein the second communication session further includes establishing a direct connection between the user and the content provider using the second communication data channel.

17. The device of claim 14, wherein one or more of the first communication session and the second communication session occur in near real-time.

18. The method of claim 1, wherein the content includes at least one of video data and audio data.

19. The method of claim 1, wherein the content provider is an intermediary.

20. A computer program product comprising computer executable instructions stored on a non-transitory computer readable medium that when executed by a processor instruct the processor to:
establish a first communication session with a user using a first embedded communication data channel;
during the first communication session, establish a second communication session using a second embedded communication data channel, wherein:
the first embedded communication data channel involves a first communication protocol; and
the second embedded communication data channel involves a second communication protocol different from the first communication protocol and the second communication protocol uses a real time protocol;
exchange a profile based on establishing the second embedded communication data channel, wherein the exchanged profile is associated, at least in part, with the user and with a content provider, wherein the exchanged profile includes use information about the user; and
while simultaneously maintaining the first communication session and the second communication session, exchange content with the user based on the exchanged profile, wherein:
the exchanged profile includes information about the user;
the exchanged content includes an advertisement;
the second embedded communication data channel is used to create a bi-directional communication between the user and the content provider; and
the second embedded communication data channel is created prior to the bi-directional communication between the user and the content provider and is terminated after a completion of the bi-directional communication.

* * * * *